Patented May 6, 1930

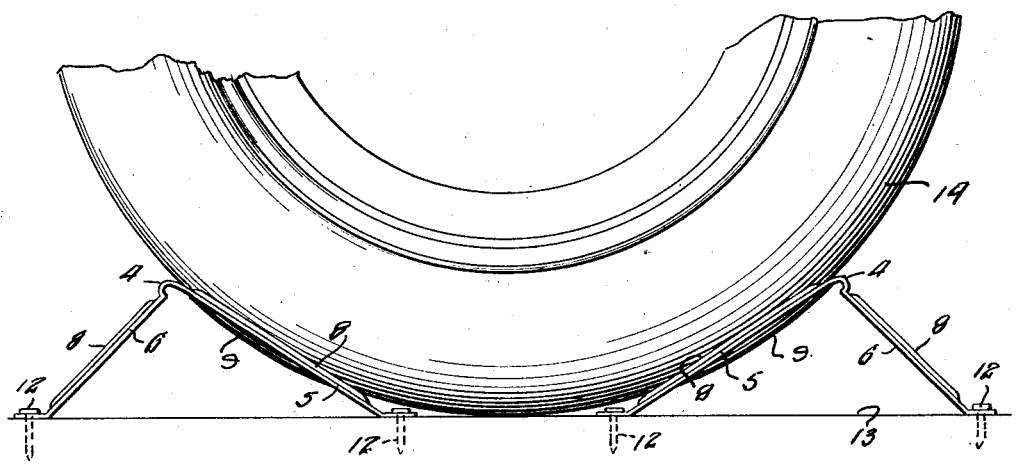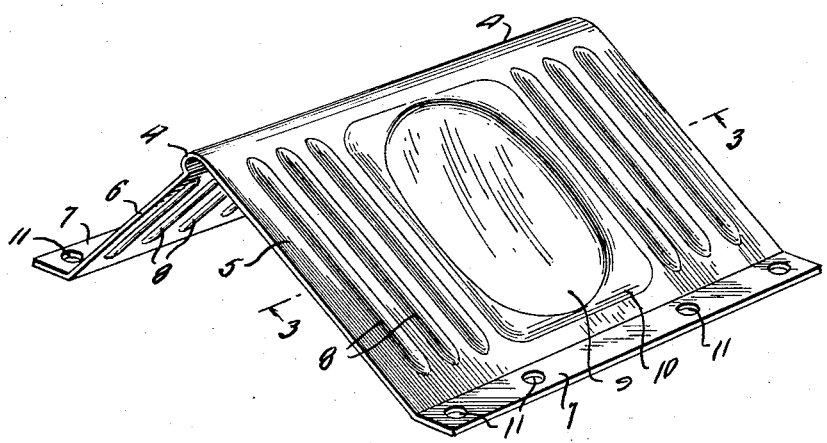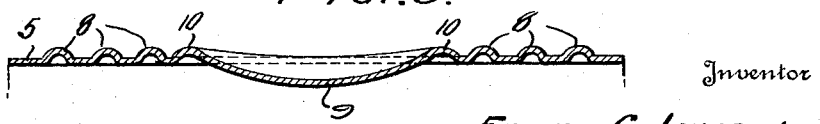

1,757,866

UNITED STATES PATENT OFFICE

EDWARD G. JOHNSON, OF NEW PHILADELPHIA, OHIO, ASSIGNOR OF ONE-HALF TO FRANK G. KRAUM, OF DOVER, OHIO

CHOCK

Application filed June 14, 1928. Serial No. 285,334.

My invention relates to improvements in chock-blocks, and it consists in the construction and arrangements herein described and claimed.

An object of my invention is to provide a device for holding a vehicle securely during transit.

Another object of the invention is to provide a block of one-piece material which will hold its shape, and one which cannot tip when a load is placed thereon and unloosen the nails or screws which secure the block to its supporting surface.

A further object of my invention is to provide a device of the character described, which is extremely simple in construction, which is strong and durable, and which is thoroughly practical for the purpose intended.

Other objects and advantages will appear in the following specification, and the novel features of the invention will be particularly pointed out in the appended claim.

My invention is illustrated in the accompanying drawing, forming part of this application, in which Figure 1 is a side elevation of a tire held by the chock-blocks, Figure 2 is a perspective view of a chock-block, and Figure 3 is a horizontal cross-section on line 3—3 of Fig. 2.

The same parts are indicated by the same reference numerals throughout the several views.

In carrying out my invention, I make use of a relatively wide band of heavy gage sheet steel or other metal. The band of steel or plate is bent intermediate its transverse edges at 4 forming angularly disposed faces 5 and 6. Transverse feet 7 are bent on the free end of each face. In both faces are longitudinal beads forming ribs 8 strengthening the same.

A trough or cup-shaped depression 9 is pressed or fashioned of a size and shape to conform to the outer surface or tread of a vehicle tire. Around depression 9 is a rectangular bead 10 to strengthen the same and to afford additional carrying area.

In the transverse feet 7 are a plurality of apertures or holes 11 each adapted to receive a screw or nail 12 to hold a chock-block in position on a flooring 13 of a freight car or warehouse. Fig. 1 shows a tire 14 firmly held by two chock-blocks.

When not in use the chock-blocks are kept flat to save space. They may be readily bent on transverse edge 4 when desired. They present no sharp edges, are quickly applied, are inexpensive, and the tire holding trough can be cupped for any size tire. I wish to stress it as it is a feature of my invention, that in practice I make the beads and ribs 8 substantially the length of the depression 9 which greatly strengthens the device.

It must be understood that only a preferred embodiment of my invention is herein shown and described and that any departure from the same, such as in size, shape or arrangement of parts may be resorted to without departing from the spirit of the invention or the scope of the subjoined claim.

What I claim and desire to secure by Letters Patent in the United States is:

A chock comprising a rectangular plate bent transversely near its middle to form two angularly disposed rectangular portions, flanges bent upwardly at each transverse end of the plate, a depression in one of the angularly disposed plates, strengthening ribs on each portion of the plate parallel to the depression and a rectangular bead around the depression.

EDWARD G. JOHNSON.